(12) United States Patent
Fee

(10) Patent No.: US 7,242,831 B2
(45) Date of Patent: Jul. 10, 2007

(54) LOW STRAIN OPTICAL FIBER CABLE

(75) Inventor: John A. Fee, Garland, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 115 days.

(21) Appl. No.: 11/057,275

(22) Filed: Feb. 11, 2005

(65) Prior Publication Data
US 2005/0201696 A1 Sep. 15, 2005

Related U.S. Application Data

(60) Provisional application No. 60/547,785, filed on Feb. 27, 2004, provisional application No. 60/547,786, filed on Feb. 27, 2004.

(51) Int. Cl.
*G02B 6/44* (2006.01)
(52) U.S. Cl. ............... 385/103; 385/102; 385/112; 385/113
(58) Field of Classification Search ........ 385/113–114, 385/128, 101, 123; 405/177
See application file for complete search history.

(56) References Cited

U.S. PATENT DOCUMENTS

| | | | | |
|---|---|---|---|---|
| 4,692,063 A * | 9/1987 | Conti | ................ | 405/177 |
| 4,729,629 A * | 3/1988 | Saito et al. | ................ | 385/101 |
| 4,859,025 A * | 8/1989 | Houghton | ................ | 385/114 |
| 5,042,907 A * | 8/1991 | Bell et al. | ................ | 385/123 |
| 5,509,097 A * | 4/1996 | Tondi-Resta et al. | ........ | 385/113 |
| 5,555,335 A * | 9/1996 | Barker et al. | ................ | 385/100 |
| 5,630,003 A * | 5/1997 | Arroyo | ................ | 385/113 |
| 6,798,958 B2 * | 9/2004 | Bourget et al. | ............. | 385/113 |
| 6,813,421 B2 * | 11/2004 | Lail et al. | ................ | 385/101 |
| 6,973,246 B2 * | 12/2005 | Bocanegra et al. | ......... | 385/113 |
| 7,050,688 B2 * | 5/2006 | Lochkovic et al. | ......... | 385/128 |

* cited by examiner

*Primary Examiner*—Frank G. Font
*Assistant Examiner*—Guy G. Anderson

(57) ABSTRACT

An optical fiber assembly includes a central strength member, multiple tubes, stranded yarn, a water protection layer, reinforced strength yarns and an outer sheath. At least one of the multiple tubes has one or more optical fibers disposed within. The stranded yarn is formed around the multiple tubes and the central strength member. The water protection layer is formed around the stranded yarn. The reinforced strength yarns are formed around the water protection layer and the outer sheath is formed around the reinforced strength yarns. The optical fiber assembly has an overall diameter of less than about 11.5 mm and exhibits low strain when subjected to a tension of at least 600 pounds.

16 Claims, 4 Drawing Sheets

LOW STRAIN OPTICAL FIBER CABLE

CROSS REFERENCE TO RELATED APPLICATION

The instant application claims priority from provisional application Nos. 60/547,785 and 60/547,786, both filed Feb. 27, 2004, the disclosures of which are incorporated by reference herein in their entirety.

FIELD OF THE INVENTION

Implementations consistent with the principles of the invention relate generally to optical fiber cables and, more particularly, to low strain optical fiber cables.

BACKGROUND OF THE INVENTION

With the explosion in communication via the Internet in recent years, there has been a corresponding increase in demand for high bandwidth communications, such as that provided by optical fibers. Optical fiber cables have been deployed over short distances ranging from a few hundred feet, such as within a building or between nearby buildings, to a few thousand feet in some metropolitan and fiber-to-the-curb installations. Various techniques for pulling or blowing of communication fibers have been employed for both initial and add-on installations through ducts or tubes over these relatively short distances. Installations exceeding one or two thousand feet present challenges in fiber cable breakage and degraded fiber performance. The performance of optical fibers, such as Medium Dispersion Fiber types can be extremely sensitive to cabling effects. Inadequate cable designs allow excessive installation forces to be imparted to fibers within the cable.

"Backbone" or "long haul" optical fiber installations spanning inter-city distances of tens or hundreds of miles are considerably more difficult to achieve using convenient cable blowing techniques. When conventional fiber cables designed for building riser applications are applied to long haul installations, they are susceptible to breakage or excessive strain resulting in risky installations and poor fiber performance. Therefore, there exists a need for optical fiber cable suitable for long span optical fiber installations.

SUMMARY OF THE INVENTION

In accordance with one aspect consistent with the principles of the invention, an optical fiber cable assembly is provided. In accordance with an exemplary embodiment, the optical fiber cable assembly includes a central strength member and multiple cylindrical elements, where at least one of the multiple cylindrical elements has one or more optical fibers disposed within. The optical fiber cable assembly further includes stranded yarn formed around the multiple cylindrical elements and the central strength member and a water protection layer formed around the stranded yarn. The optical fiber cable assembly also includes reinforced strength yarns formed around the water protection layer and an outer sheath formed around the reinforced strength yarns.

According to another aspect consistent with the principles of the invention, an optical fiber assembly is provided. The optical fiber assembly includes a strength member and multiple tubes, where optical fibers are disposed within the multiple tubes. The optical fiber assembly further includes a reinforced structure surrounding the multiple tubes and the strength member, where the reinforced structure does not experience any significant strain until a tension upon the fiber assembly on the order of 600 pounds is reached. The optical fiber assembly may alternatively be characterized in that optical fibers within the fiber assembly do not suffer significant strain or degradation in performance even when a tension of at least 600 pounds is applied to the overall fiber cable assembly.

According to yet another aspect consistent with the principles of the invention, a method of installing an optical fiber cable is provided. The method includes selecting an optical fiber cable with a yield strength on the order of 600 pounds and having an outer diameter of less than about 11.5 mm and, to facilitate some applications, preferably less than 10 mm. The method further includes installing the optical fiber cable in a duct using cable blowing techniques.

According to a further aspect consistent with the principles of the invention, a method of forming an optical fiber assembly is provided. The method includes selecting a central strength member and disposing one or more optical fibers within at least one of multiple tubes. The method further includes forming stranded yarn around the multiple tubes and the central strength member and forming a water protection layer around the stranded yarn. The method also includes forming reinforced strength yarns around the water protection layer and forming an outer sheath around the reinforced strength yarn. The resulting assembly exhibits very low elongation at a tensile load of 600 pounds and an overall diameter of less than or equal to 11.5 mm.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

An optical fiber assembly consistent with the principles of the invention improves the protection provided to optical fiber installations. Optical fiber protection is improved through the use of a reinforced cable structure that has a yield strength and/or tensile strength rating that is higher than existing blown optical fiber cables which are small enough for blown installation. Thus, fiber performance should not be degraded when employing existing cable blowing or pulling techniques for installing the optical fiber cable. An optical fiber assembly consistent with the principles of the invention is preferably a 'microcable' designed for installation by a compressed air blowing method and having the ability and construction characteristics to be suitable for deployment in, for example, an underground duct either with or without a "microduct" installed.

Exemplary Optical Fiber Cable Assembly

Figure 1:
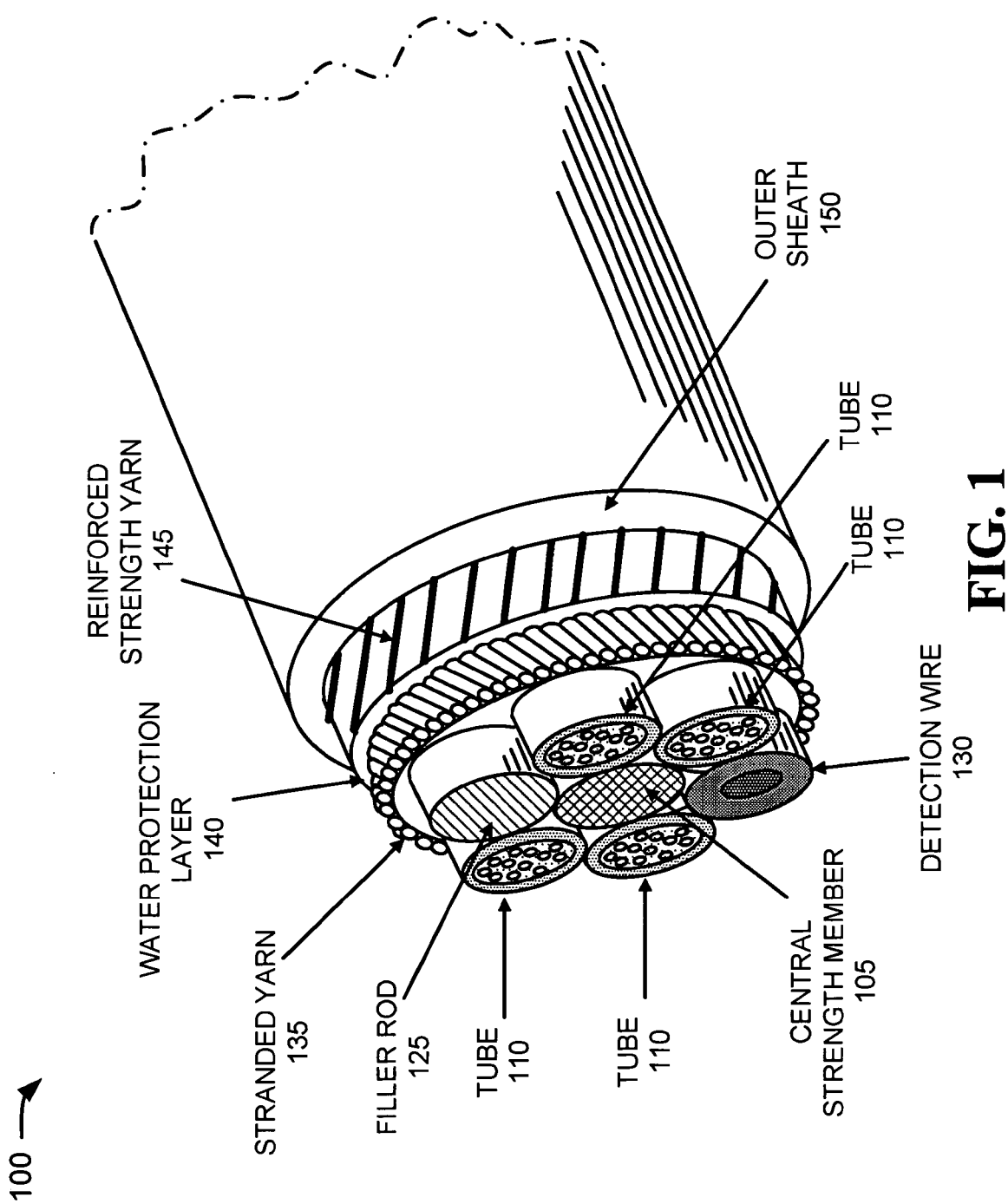
FIG. 1 illustrates a three dimensional view of an exemplary optical fiber cable assembly according to an aspect of the invention.
Figure 2:
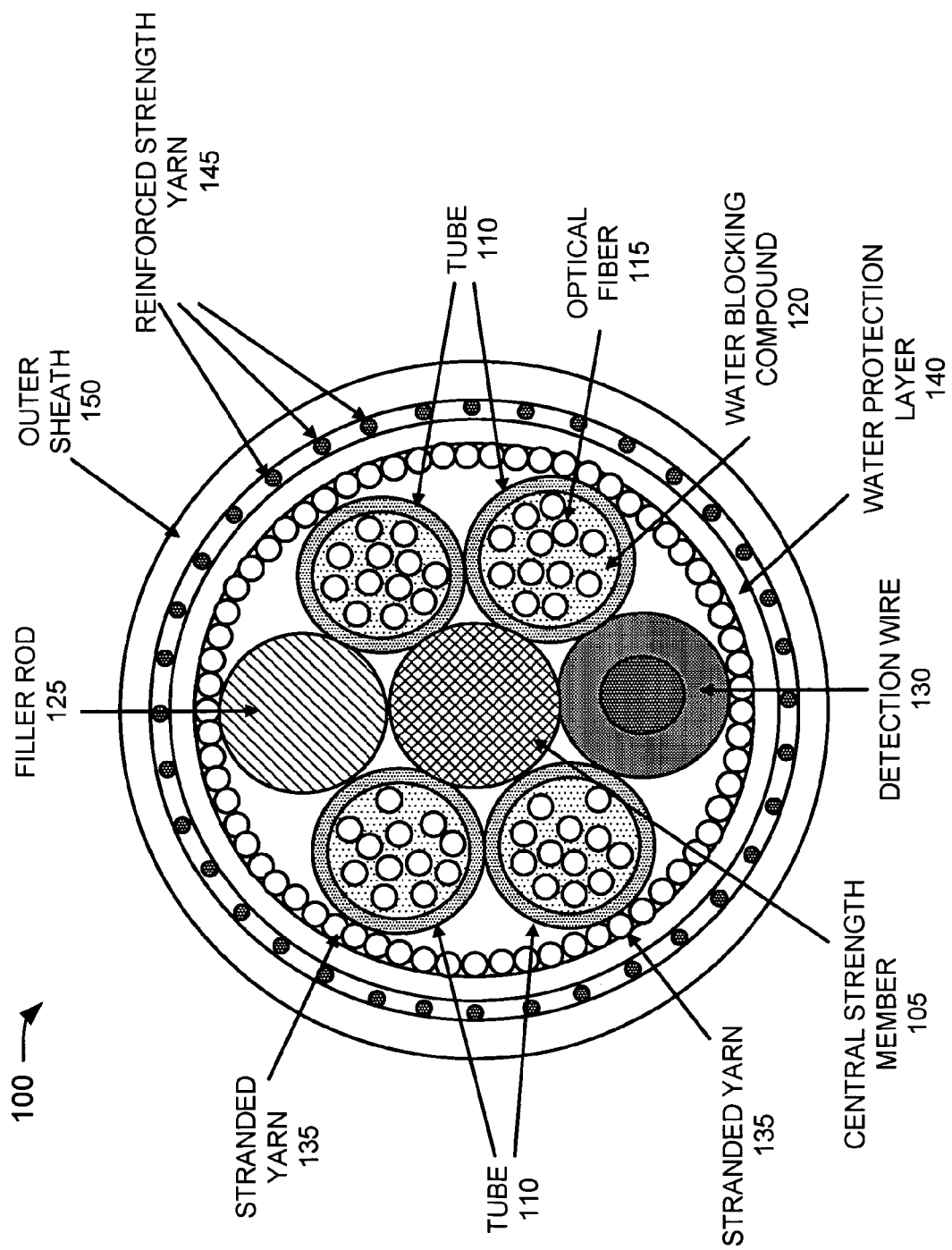
FIG. 2 illustrates a cross sectional view of the exemplary optical fiber cable assembly of FIG. 1 consistent with an aspect of the invention.

FIGS. 1 and 2 illustrate two different views of an exemplary optical fiber cable assembly 100 consistent with an aspect of the invention. Optical fiber cable assembly 100 may include a central strength member 105, one or more tubes 110, one or more filler rods 125, a detection wire 130, stranded yarn 135, a water protection layer 140, reinforced strength yarn 145 and an outer sheath 150. Tube(s) 110, filler rod(s) 125 and detection wire 130 may be stranded around central strength member 105 with stranded yarn 135. Central strength member 105 may include a cylindrical structure that may include, for example, a glass reinforced plastic (GRP) material and may be over-coated with polyethylene. Central strength member 105 may provide a central member around which the remaining elements of assembly 100 may be stranded. In one implementation, central strength member 105 may have an outer diameter of 2.3 mm.

Tube(s) 110 may each include a hollow cylindrical structure that may further include a thermoplastic material, such as, for example, polybutylene terephthalate (PBT). In one implementation, tube(s) 110 may have an outer diameter of 2.2 mm. Tube(s) 110 may have multiple optical fibers 115 and a suitable water-blocking compound 120 disposed within them. Each optical fiber 115 may include any type of optical fiber, such as, for example, TeraLight Ultra™ optical fiber manufactured by Alcatel Corporation. Water blocking compound 120 may include, for example, polyolefin oil.

Filler rod(s) 125 may include a cylindrical structure that may include, for example, a heat resistive material, such as, for example, a thermoplastic material such as PBT. Filler rod(s) 125 may be sufficiently filled with a non-toxic, non-hygroscopic, non-nutrient to fungus, electrically non-conducting compound which is compatible with all cable components and readily removable with existing cleaning solvents. Filler rod 125 may "fill in" space within assembly 100 not filled by tubes 110. In one implementation, filler rod(s) 125 may have an outer diameter of 2.2 mm. Detection wire 130 may include, for example, an insulated copper wire, such as, a 19 AWG copper wire. Detection wire 130 may be used for conventional "toning" of optical fiber cable assembly 100. In one implementation, detection wire 130 may have an outer diameter of 2.2 mm. Detection wire 130 may include, in other aspect of the invention, two 22 AWG insulated copper wires. In other implementations, detection wire 130 may be contained outside the cable (near the cable) or as part of the cable outer jacket to reduce the damage during a lightning strike.

Stranded yarn 135 may include, for example, an existing type of cable yarn stranded around tube(s) 110, filler rod(s) 125, detection wire 130 and central strength member 105. Water protection layer 140 may include existing water swellable powders, tape, yarns, threads or coating layers that ensure cable longitudinal water tightness. Reinforced strength yarn 145 may include, for example, dielectric reinforced strength yarns that are laid beneath outer sheath 150 to reach desired tensile characteristics. Yarn 145 may include, for example, aramid yarns or other materials exhibiting a high modulus of elasticity.

Outer sheath 150 may include, for example, a jacket of nylon, medium density polyethylene (MDPE), or high density polyethylene (HDPE) material. In one implementation, outer sheath 150 may have an outer diameter of 8.5 mm. Optical fiber assembly 100 may, thus, in one implementation, have an optical fiber density of 48 optical fibers per each 8.5 mm diameter cable assembly. In other implementations, outer sheath 150 may have an outer diameter ranging from approximately 6 mm to about 15 mm. A diameter of less than about 11.5 mm is considered advantageous to facilitate some installations, such as using gas pressure to carry a cable through a conduit. A diameter of less than 10 mm is advantageous to facilitate blown installation over long distances and to accommodate some bends along the path.

In the construction just described, properly selected strength members and yarns contribute to a high modulus and yield strength of the overall fiber cable assembly. This is an important design aspect for long haul installations. Optical fibers 115 may lay loosely within each tube 110, which mostly prevents forces applied to the cable assembly overall from being coupled to the optical fibers. However, if the strain of the cable is not limited by suitably designed strength members and elements to control elongation, then excessive stretching, permanent deformation and even total breakage can occur as tension is applied to the cable in long-haul applications. In real-world applications, this control of strain of the strength members under load becomes more critical to fiber performance and survival as the overall length and the number of turns in the installation increases. By tightly controlling strain of strength members in accordance with the present teachings, a fiber assembly cable maintains a substantially 'strain-free' environment for the enclosed optical fibers.

In accordance with a preferred embodiment of the present teachings, fiber cable assembly 100 will experience a cable elongation of less than about 0.05% when a tension of 180 pounds is applied and an elongation of less than about 0.5% when a tension of 600 pounds is applied. This is primarily achieved by the proper design of key strength elements, such as central strength member 105 and yarn 145. As for the optical fibers disposed in the tubes, the attenuation for a 100 m length of fiber will preferably change by less than 0.10 dB for either of these tension levels in a fiber cable assembly made in accordance with the present teachings. Furthermore, the strain on the fibers, as inferred from change in attenuation of optical signals carried through the fibers or measured from OTDR readings, should remain less than about 0.20%. The yield strength of the fiber cable assembly should meet or exceed 600 pounds such that, upon relieving the tension on the fiber cable assembly, the assembly exhibits an elastic response and returns to its original length, or an elongation of essentially 0%. Accordingly, any significant shift in fiber strain or attenuation occurring when the cable is under load should subside when the load is removed. As those of ordinary skill in the art will recognize, these characteristics may be specified to hold true over a range of operating temperatures or over a range of optical wavelengths propagating through the optical fibers.

Other attributes of a fiber cable assembly 100 may include high compression strength and tolerance of bending and twisting. In particular, fiber cable assembly may be installed where a permanent bend may be imposed on the cable having a radius of less than 100 mm or less than ten times the outer diameter of the assembly. In a properly designed cable assembly according to the present invention, this permanent bend should cause no significant degradation of fiber performance.

Exemplary Optical Fiber Cable Assembly Formation Process

Figure 3:
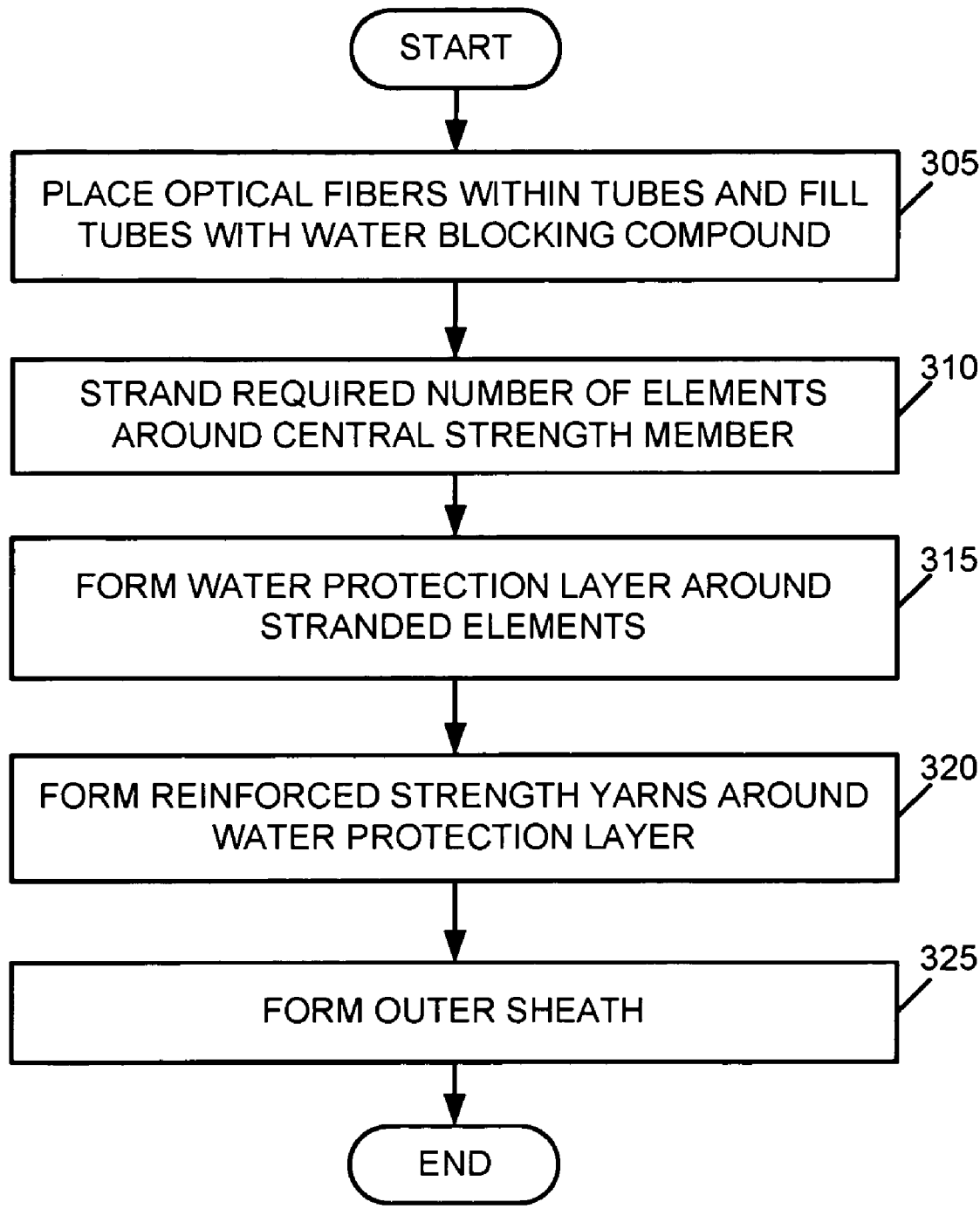
FIG. 3 illustrates an exemplary process for constructing an optical fiber cable assembly according to an aspect of the invention.

FIG. 3 is a flowchart that illustrates an exemplary process, consistent with one aspect of the invention, for forming optical fiber cable assembly 100 of FIGS. 1 and 2. The exemplary process may begin with the placement of optical fibers 115 within each tube 110, and the filling of each tube 110 with a suitable water blocking compound 120 (act 305). The optical fibers 115 may be "threaded" through each tube 110 using existing techniques. A required number of elements may then be stranded around central strength member 105 (act 310). The required number of elements may be stranded around central strength member 105 using, for example, a reverse lay stranding process. The number of elements (e.g., number of tubes 110 and filler rods 125) may vary according to design requirements. For example, in one implementation, 1 tube 110, 4 filler rods 125 and one detection wire 130 may be stranded around central strength member 105. In another implementation, 2 tubes 110, 3 filler rods 125 and one detection wire 130 may be stranded around central strength member 105. In a further implementation, 3 tubes 110, 2 filler rods 125 and one detection wire 130 may be stranded around central strength member 105. In yet another implementation, 4 tubes 110, one filler rod 125 and one detection wire 130 may be stranded around central strength member 105. According to one implementation of the invention, tube(s) 110, filler rod(s) and detection wire 130 may be 'SZ stranded' around central strength member 105 in accordance with existing techniques.

After stranding the required number of elements around central strength member 105, water protection layer 140 may be formed around the stranded elements (act 315). Water protection layer 140 may be formed using existing techniques, depending on whether water-swellable powders, tape, yarns, threads or coating layers are used to ensure cable water tightness. Reinforced strength yarns 145 may be formed around water protection layer 140 (act 320). The yarns 145 may include dielectric yarns, such as, for example, aramid yarns, and may be formed using existing techniques. Outer sheath 150 may then be formed around reinforced strength yards 145 (act 325). Outer sheath 150 may be formed using existing cable jacket formation techniques.

Exemplary Optical Fiber Cable Placement Process

Figure 4:
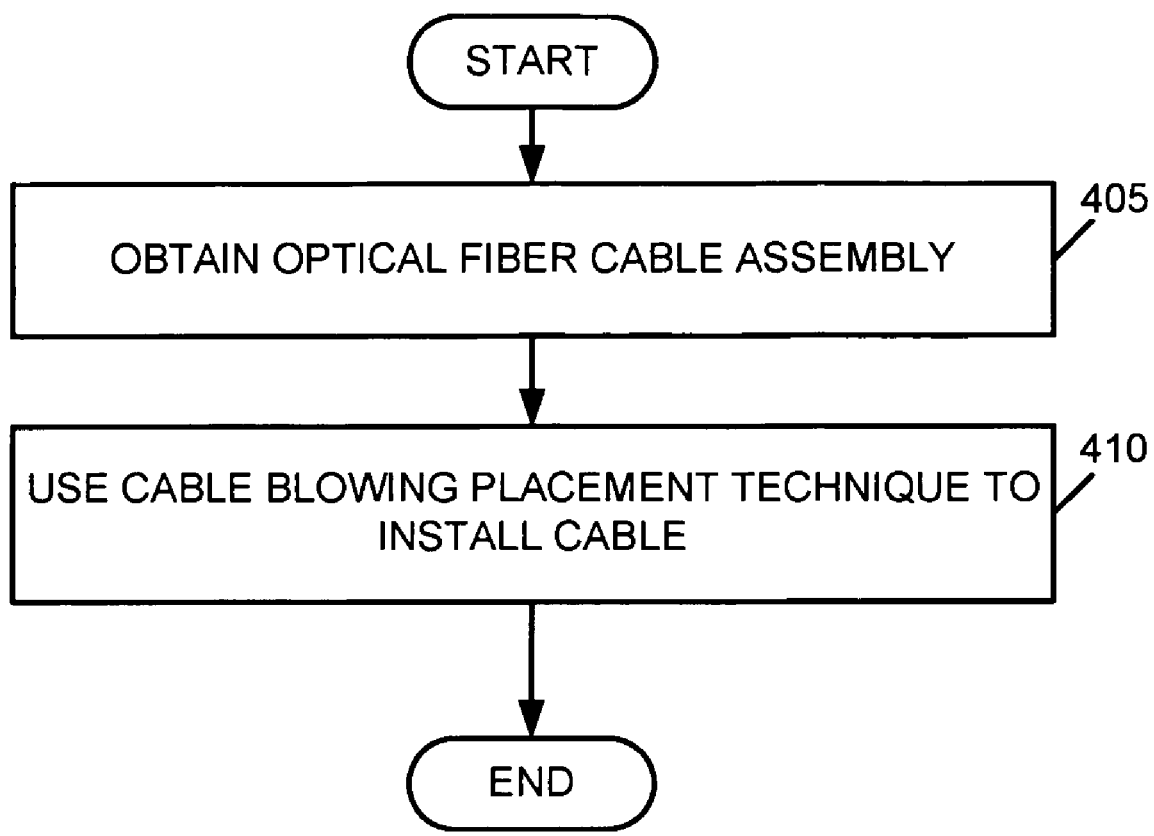
FIG. 4 illustrates an exemplary process for using a cable blowing placement technique to install the optical fiber cable assembly of FIGS. 1 and 2 according to an aspect of the invention.

FIG. 4 is a flowchart that illustrates an exemplary process, consistent with the principles of the invention, for using a "blowing" technique to place optical fiber cable assembly 100 within, for example, a duct, tube, channel or pipe. In other implementations, existing "pulling" techniques may be used to place optical fiber cable assembly 100 within a duct or other conduit. A fiber cable assembly in accordance with the present teachings may be selected for installation in ducts exceeding two kilometers in length due to the low strain characteristics at a 600 pound tension and due to the diameter being less than or equal to 11.5 mm. The 'microcable' aspects of the design may be desirable in such installations as well.

The exemplary placement process may begin with obtaining appropriate length optical fiber cable assembly 100 (act 405). The optical fiber cable assembly 100 may be constructed in accordance with the exemplary process of FIG. 3. A cable "blowing" placement technique may then be used to install the cable assembly 100 in a duct (act 410). Cable "blowing" placement techniques, also called cable "jetting," may use the flow of pressurized fluid, such as air, coupled with a mechanical push device (e.g., a caterpillar drive or feed rollers) to place the cable within the duct. Some cable "blowing" systems require the use of air capturing devices (e.g., a shuttle, parachute, or projectile) attached to one end of the cable, while other "blowing" systems rely solely upon a viscous flow of air applying drag forces on the outer walls of the cable combined with a low pushing force generated by, for example, a caterpillar drive feeding the cable into one end of the duct.

CONCLUSION

Consistent with the invention, an optical fiber assembly has a reinforced cable structure that improves the protection provided to optical fiber installations. The optical fiber assembly does not experience significant strain unless a tension of at least 600 pounds is reached, thus, protecting the optical fiber from damage that may occur during cable blowing or pulling techniques that may degrade fiber performance. The reinforced cable can be of any design which will meet the 600 pound low-strain design requirements. Aspects of the invention, thus, provide a small diameter cable (e.g., microcable of less than about 11.5 mm) design that provides virtually strain-free operation for optical fibers up to a cable tension on the order of approximately 600 pounds. To facilitate installation over long distances (>1 km), for example by pulling the cable or by using the flow of pressurized gas through a conduit, an overall diameter of less than or equal to 10 mm is considered advantageous for sustaining high tensile forces while carrying a worthwhile quantity of optical fibers or tubes to accommodate fibers.

The foregoing description of embodiments of the present invention provides illustration and description, but is not intended to be exhaustive or to limit the invention to the precise form disclosed. Modifications and variations are possible in light of the above teachings or may be acquired from practice of the invention. While series of acts have been described with respect to FIGS. 3 and 4, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. An optical fiber cable assembly, comprising:
a central strength member; a plurality of cylindrical elements, wherein at least one of the plurality of cylindrical elements has one or more optical fibers disposed within; stranded yarn formed around the plurality of cylindrical elements and the central strength member; a water protection layer formed around the stranded yarn; reinforced strength yarns formed around the water protection layer; and an outer sheath formed around the reinforced strength yarns~wherein the assembly has an outer diameter ranging from about 6 mm to about 15 mm and wherein the one or more optical fibers experience less than or equal to 0.20% tensile strain when 600 pounds of tension is applied to the assembly.

2. The optical fiber cable assembly of claim 1 wherein the assembly has an outer diameter less than or equal to about 11.5 mm.

3. The optical fiber cable assembly of claim 1 wherein the assembly has an outer diameter less than or equal to about 10 mm.

4. The optical fiber cable assembly of claim 1, wherein the central strength member comprises a glass reinforced plastic (GRP) material.

5. The optical fiber cable assembly of claim 4, wherein the GRP material is overcoated with polyethylene.

6. The optical fiber cable assembly of claim 1, wherein the reinforced strength yarns comprise dielectric yarns.

7. The optical fiber cable assembly of claim 1, wherein the reinforced strength yarns comprise aramid yarns.

8. The optical fiber cable assembly of claim 1, wherein at least one of the plurality of cylindrical elements comprises an insulated, conducting wire.

9. The optical fiber cable assembly of claim 1, wherein the at least one of the plurality of cylindrical elements comprises at least one fiber tube with the one or more optical fibers disposed within and wherein each fiber tube has an outer diameter of approximately 2.2 mm.

10. An optical fiber assembly, comprising:
a strength member; a plurality of tubes, wherein optical fibers are disposed within the plurality of tubes; and a reinforced structure surrounding the plurality of tubes and the strength member, wherein the optical fiber assembly is less than or equal to 11.5 millimeters in diameter wherein the optical fibers experience less than or equal to 0.20% tensile strain when 600 pounds of tension is applied to the optical fiber assembly.

11. The optical fiber assembly of claim 10 wherein the optical fiber assembly has an overall diameter of less than or equal to about 10 mm.

12. The optical fiber assembly of claim 10, wherein the reinforced structure comprises:
stranded yarn formed around the plurality of tubes and the strength member;
a water protection layer formed around the stranded yarn;
reinforced strength yarns formed around the water protection layer; and
an outer sheath formed around the reinforced strength yarns.

13. The optical assembly of claim 12, wherein the reinforced strength yarns comprise dielectric yarns.

14. The optical fiber assembly of claim 13, wherein the dielectric yarns comprise aramid yarns.

15. A method of installing an optical fiber cable, comprising:
selecting an optical fiber cable having an outer diameter ranging from about 6 mm to about 15 mm and with a yield strength rating on the order of 600 pounds wherein optical fibers within the optical fiber cable experience less than or equal to 0.20% tensile strain when 600 pounds of tension are applied to the optical fiber cable; and installing the optical fiber cable in a duct using cable blowing techniques.

16. The method of claim 15, wherein the duct is greater than 2 kilometers in length.

* * * * *